United States Patent [19]

Miyazaki et al.

[11] Patent Number: 5,830,556
[45] Date of Patent: Nov. 3, 1998

[54] MAGNETIC RECORDING MEDIUM

[75] Inventors: Takahiro Miyazaki; Koji Inomata, both of Miyagi, Japan

[73] Assignee: Sony Corporation, Tokyo, Japan

[21] Appl. No.: 851,484

[22] Filed: May 5, 1997

Related U.S. Application Data

[63] Continuation of Ser. No. 577,218, Dec. 22, 1995, abandoned.

[30] Foreign Application Priority Data

Dec. 28, 1994 [JP] Japan .................................. 6-329155
Dec. 28, 1994 [JP] Japan .................................. 6-329157
Apr. 7, 1995 [JP] Japan .................................. 7-082996

[51] Int. Cl.$^6$ ................................................ G11B 05/712
[52] U.S. Cl. .......................... 428/141; 428/323; 428/328; 428/332; 428/340; 428/694 B; 428/394 BA; 428/694 BG; 428/694 BN; 428/694 BR; 428/900
[58] Field of Search .................................. 428/141, 323, 428/328, 332, 340, 694 B, 694 BZ, 694 BG, 694 BN, 694 BR, 900

[56] References Cited

U.S. PATENT DOCUMENTS

| 3,794,519 | 2/1974 | Akashi et al. | 117/235 |
|---|---|---|---|
| 4,146,671 | 3/1979 | Fujiyama et al. | 428/328 |
| 4,604,296 | 8/1986 | Aonuma et al. | 427/57 |
| 4,609,588 | 9/1986 | Hosaka et al. | 428/329 |
| 5,034,271 | 7/1991 | Miyoshi et al. | 428/323 |
| 5,217,820 | 6/1993 | Isshiki et al. | 428/694 B |

FOREIGN PATENT DOCUMENTS 62-192954   8/1987   Japan .

*Primary Examiner*—Stevan A. Resan
*Attorney, Agent, or Firm*—Hill & Simpson

[57] ABSTRACT

A magnetic recording medium comprising a substrate made of non-magnetic material, and a magnetic layer formed on the substrate, the magnetic layer being composed primarily of a ferromagnetic powder and a binder, wherein an amount of a sulfuric ion extracted when the magnetic recording medium is immersed in a pure water having a temperature of 30° C. for one hour, is 100 $\mu$g or less per one square meter of the magnetic recording medium.

9 Claims, No Drawings

MAGNETIC RECORDING MEDIUM

This is a continuation of application Ser. No. 08/577,218, filed Dec. 22, 1995 now abandoned.

BACKGROUND OF THE INVENTION

This invention relates to a magnetic recording medium comprising a non-magnetic substrate and a magnetic layer coated on the substrate and composed of a ferromagnetic powder and a binder, and more particularly to a magnetic recording medium having improved travelling performance and high durability.

In the field of magnetic recording media such as video tapes or films, particular attention has been paid to improvement in electromagnetic conversion properties in order to achieve a high-density and high-resolution recording which gives a high image quality upon reproduction. At the present, there has been proposed and used a thin layer-type medium such as a vapor-deposited tape which exhibits suitable electromagnetic conversion properties. Such a thin layer-type medium has already been utilized as a recording medium for a part of Hi-8 video recording apparatuses. However, from a standpoint of productivity and price-competitiveness, the coating type magnetic recording medium has been still predominantly used.

The prior magnetic recording medium generally includes a non-magnetic substrate and a magnetic coating layer applied on the substrate and composed of a ferromagnetic powder, a binder, and additives such as an antistatic agent, abrasive, etc. The magnetic layer is formed by coating a magnetic coating composition, which is prepared by dispersing the above components in an organic solvent and mixing them together, on the non-magnetic substrate.

In the coating type magnetic recording medium, in order to improve its electromagnetic conversion properties, there have been taken the measures such as fine pulverization of the ferromagnetic powder, enhancement of its magnetic properties, formation of mirror-polished surface of the magnetic layer for reducing the spacing loss, etc.

To this end, a ferromagnetic metal powder having a high residual magnetic flux density and a high coercive force has been for example used instead of iron oxide-series magnetic powders in order to improve the magnetic properties of a ferromagnetic powder. Many intense studies have been made on orientation of the ferromagnetic powder, selection of binders or dispersing agents capable of finely and uniformly dispersing the ferromagnetic powder therein, and kneading or mixing method of the magnetic coating composition. On the other hand, a surface of the magnetic layer is mirror-polished to reduce the spacing loss. Various studies have been also made on optimum conditions for a calendar treatment by which such a mirror-polished surface can be obtained.

However, nevertheless the above-mentioned measures are taken to enhance its electromagnetic conversion properties, the prior magnetic recording medium still has problems such as lowered output when it is exposed to repeated transportation while being in contact with a magnetic head. As a result, the electromagnetic conversion properties of the ferromagnetic powder is eliminated with elapsed time whereby the magnetic recording medium cannot endure an actual use.

The lowered output occurred when the magnetic recording medium is subjected to the repeated transportation, is considered to be due to deterioration of the magnetic head rather than that of the recording medium because of the following phenomena:

(1) Extremely severe deterioration is observed under a low-humidity environment in which an abrasion force of the abrasive is lowered.
(2) The output is recovered when a lapping tape (polishing tape) is used to polish a surface of the head.
(3) The deterioration of the head is actually observed when the magnetic recording medium is subjected to repeated transportation while being in contact with the head.

It is suggested that the deterioration of the output from the magnetic recording medium is attributed to the fact that the deteriorated portion of the head functions as a magnetic spacing formed between the magnetic recording medium and the head gap.

In order to restore an output having a suitable level, it is necessary to take such a measure that much amount of abrasive is added to the magnetic layer to thereby rub off the deteriorated portion of the head. However, if the lapping tape or a magnetic tape containing much amount of the abrasive is used repeatedly, a depth of the magnetic gap of the head is shortened so that the head is finally damaged to such an extent that it cannot endure an actual use.

Such a deterioration of the output due to the loss of spacing becomes more severe as a wave length of the recorded signals is decreased. Under these circumstances, it is required to take any measure by which a high-density recording characteristic of the coating type magnetic recording medium is considerably improved.

OBJECT AND SUMMARY OF THE INVENTION

Accordingly, it is an object of the invention to provide a magnetic recording medium having improved properties which is capable of maintaining an initial electromagnetic conversion characteristic even after repeated transportation over a magnetic head and preventing a surface of the head from being deteriorated.

It has been found that the deterioration of a surface of a magnetic head which occurs upon repeated transportation of a magnetic recording medium over the magnetic head is due to the existence of sulfur which is contained in the magnetic recording medium and fed to the surface of the head therefrom. Therefore, the deterioration of the electromagnetic conversion characteristic can be considerably prevented when an amount of sulfur fed from the magnetic recording medium to the surface of the head is decreased. The present invention is accomplished based on the finding.

In accordance with one aspect of the present invention, there is provided a magnetic recording medium including a substrate made of a non-magnetic material and a magnetic layer formed on the substrate and composed primarily of a ferromagnetic powder and a binder, wherein an amount of a sulfate ion extracted when said magnetic recording medium is immersed in pure water having a temperature of 30° C. for one hour, is 100 $\mu$g or less per one square meter of the magnetic recording medium.

Unexpectedly, the magnetic recording medium of the present invention can show an improved magnetic property without eliminating an initial electromagnetic conversion characteristic and generating a loss of spacing due to deterioration of the magnetic head. The advantage can be achieved when the content of the magnetic recording medium is so adjusted that the amount of sulfate ion extracted by pure water from the magnetic recording medium, is limited to 100 $\mu$g or less per one square meter of the magnetic recording medium. Since the amount of sulfate ion extracted by pure water corresponds to an amount of sulfur transferred from the magnetic recording medium to the magnetic head upon use, the small amount of the sulfate ion extracted means that the sulfur fed to the magnetic head from the magnetic recording medium is small. Thus, when there is used a magnetic recording medium showing such a small amount of the sulfate ion extracted, almost no sulfur is transferred from the magnetic recording medium to the magnetic head so that the magnetic head does not suffer from undesirable deterioration of the surface thereof when the magnetic recording medium is subjected to repeated transportation over the magnetic head. This leads to maintaining the initial electromagnetic conversion characteristic without a loss of spacing due to the deteriorated magnetic head.

The magnetic recording medium can be obtained, for example, by using such a ferromagnetic powder that the amount of sulfate ion extracted when the powder is immersed in hot water having a temperature of 90° C. for one hour, is 20.0 µg or less per one gram of the ferromagnetic powder.

Furthermore, in accordance with another aspect of the present invention, as the ferromagnetic powder, there is used those which satisfies the above-mentioned requirements concerning the amount of the sulfate ion extracted and is composed of ferromagnetic metal powder particularly cobalt powder having an average particle size (average major axis length) of 0.20 µm or less, in a predetermined amount or higher. In addition, a binder containing a limited amount of polar group is used and the surface of the magnetic layer is finished with a limited surface roughness. These measures of the present invention can provide an improved dispersibility of the ferromagnetic powder in the magnetic layer, an enhanced magnetic property of the magnetic layer and a mirror-polished surface of the magnetic layer which lead to a further improved electromagnetic conversion characteristic of the magnetic recording medium. As a result, a magnetic property required for recording of information signals with a short wave length is also improved.

In accordance with a further aspect of the present invention, the magnetic layer of the magnetic recording medium has an optimum weight ratio of a sum of non-magnetic solid powder and magnetic powder to a binder and an appropriate amount of a higher aliphatic acid ester is added to the magnetic layer whereby a improved travelling performance and a high durability of the magnetic recording medium are obtained even after subjected to repeated transportation over a magnetic head.

More specific features, advantages and objects of the present invention will become apparent with reference to the following detailed description and appended claims.

DETAILED DESCRIPTION OF THE INVENTION

Basically, the present invention provides a magnetic recording medium including a non-magnetic substrate and a magnetic layer composed primarily of a ferromagnetic powder and a binder wherein an amount of sulfur contained in the magnetic recording medium is limited to a particular range mentioned below.

The sulfur component existing on a surface of the magnetic recording medium is apt to be transferred to a magnetic head to thereby cause a deterioration of the magnetic head when the magnetic recording medium is repeatedly transported over the magnetic head. According to the present invention, to restrict such a deterioration of the surface of the magnetic head, the sulfur content of the magnetic recording medium is so adjusted that an amount of a sulfate ion in an extract obtained when the medium is immersed in pure water having a temperature of 30° C. for one hour, is 100 µg or less per one square meter of the magnetic recording medium.

Meanwhile, the amount of the sulfate ion extracted is a measured value obtained by immersing the magnetic recording medium having an area of approximate 0.15 m² in 80 grams of pure water having a temperature of 30° C. for one hour and then subjecting the resulting extract to an ion chromatography.

The amount of the sulfate ion extracted from the magnetic recording medium is used as an index for determining an amount of sulfur transferred from the magnetic recording medium to the magnetic head. Therefore, the small amount of the sulfate ion extracted indicates the small amount of the sulfur content in the magnetic recording medium. The amount of the sulfate ion is suitably 100 µg or less, preferably 50 µg or less. By adjusting the amount of the sulfate ion to this range, no transferring of sulfur from the magnetic recording medium to the magnetic head is caused whereby the deterioration of the magnetic head is effectively prevented. This leads to preventing a loss of spacing due to the deteriorated magnetic head and therefore an initial electromagnetic conversion characteristic is maintained upon repeated use. Generally, in order to improve a travelling performance and a durability of the magnetic recording medium, a back coating layer may be provided on a back surface of the non-magnetic substrate opposed to the surface on which the magnetic layer is formed. It should be noted that the amount of the sulfate ion extracted is a value obtained with respect to the magnetic recording medium without such a back coating layer. Therefore, in a case where the amount of the sulfate ion extracted is measured with respect to the magnetic recording medium having such a back coating layer, it is necessary that the measurement is made before formation of the back coating layer or after delamination thereof.

In order to restrict the amount of sulfur transferred from the recording medium to the magnetic head, it is basically considered that the amount of sulfur itself contained in the magnetic recording medium is limited to a lower level or sulfur in the medium remains in such a state that the transfer thereof to the magnetic head does not easily occur. Specific methods are described below.

(1) Method of restricting the sulfur component in the magnetic recording medium:

The amount of sulfur contained in the magnetic recording medium is restricted by selectively using components having a low sulfur content for the magnetic layer.

To this end, it is preferred that there is used such a ferromagnetic powder that an amount of sulfate ion extracted therefrom is 20.0 µg or less per one gram when the ferromagnetic powder is immersed in hot water having a temperature of 90° C. for one hour. For example, the ferromagnetic metal powder is prepared by using iron sulfate or iron chloride as a starting material converting it to gerthite. Among them, the ferromagnetic metal powder prepared from iron chloride as a starting material is more preferable because it contains almost no sulfur and therefore can be immediately used as a component of the magnetic layer. On the other hand, the ferromagnetic metal powder prepared from iron sulfate as a starting material contains a few amount of sulfur derived from the starting material, though the production cost thereof is advantageously low. If such a material having a certain sulfur content is used, sulfur contained therein must be removed by washing to such an extent that the amount of the sulfate ion extracted therefrom reaches the above-mentioned low level. The washing treatment may be conducted at a stage of formation of gerthite or any subsequent stage before applied to the magnetic layer.

The amount of the sulfate ion extracted from the ferromagnetic powder may be measured, for example, by immersing 3.0 g of the powder in 65 milliliters of hot water having a temperature of 90° C. for one hour, adding an additional amount of water to obtain 100 milliliters of a dilute extract and, after filtering, subjecting it to an ion chromatography.

It is preferred that the binder does not have a sulfur-containing polar group such as a metal sulfate, etc., if possible. For example, the suitable polar group introduced into the binder compound includes tertiary amines, quaternary ammonium salts, carboxylic group or the like.

The additives added to the magnetic layer includes nonmagnetic pigments such as carbon black. It is preferred that these additive also has a low sulfur content.

(2) Method of maintaining sulfur contained in the magnetic layer in such a state that the transferring of sulfur does not easily occur.

To realize this method, the use of sodium or the like should be avoided because these elements render the sulfate ion more mobilized in the magnetic layer. Further, to eliminate voids in the magnetic layer, the special layered structure and calendar treatment can be used whereby the sulfur component located inside is difficult to move to a surface area of the magnetic layer.

In the following, examples of compositions used in the magnetic layer of the magnetic recording medium are described. The magnetic recording medium according to the present invention is obtained by selecting an appropriate material from the examples in view of the above-mentioned methods.

The most preferred ferromagnetic powder is ferromagnetic metal powder made of Fe, Co, Ni or an alloy thereof. Further, in the present invention, planar hexagonal ferrite such as barium ferrite, γ-iron oxide, cobalt-containing γ-iron oxide, magnetite, cobalt-containing magnetite, $CrO_2$ or the like.

Among them, the ferromagnetic metal powder containing Fe as a main component is preferred. Particularly suitable ferromagnetic metal powder includes those containing 5.0 or more atomic %, preferably 10 or more atomic % of cobalt based on Fe. The use of such a ferromagnetic metal powder contributes to improvement in electromagnetic conversion characteristic of the magnetic recording medium.

In addition, the ferromagnetic powder are preferably made of particles having an average particle size (average major axis length) of 0.20 μm or less whereby the electromagnetic conversion characteristic is further improved, leading to enhancement of recording and reproducing characteristic in the recording zone for a short wave length.

The binder usable in the present invention is not particularly restricted but may be any material employed in the normal coating type magnetic recording medium.

Specific examples of the binder include polyesters, polycarbonates, polyether-series polyurethane resins, polyester resins, vinyl chloride-series copolymers, cellulose derivatives, phenoxy resins, acrylic acid ester-series copolymers, vinylidene chloride-series copolymers, styrene-butadiene-series copolymers, or the like.

In order to enhance a dispersibility of the solid particles in the binder, an appropriate polar group may be introduced into the above-mentioned resins. Examples of suitable polar groups include —COOM, —$SO_3M$, —$OSO_3M$, —P=O$(OM)_2$, —OP=O$(OM)_2$, —$NR_4X$, —$NR_2$ or —SH wherein M represents H, Li, Na, K, $NR_4$; R is an alkyl group or a hydrogen atom; and X represents a halogen atom. These binders are used singly or in the form of a mixture of two or more different resins. The binder may be a mixture of the resin having the polar group with that having no polar group. Among them, if the resins having such a polar group as —$SO_3M$, —$OSO_3M$ and —SH are used, the amount used should be restricted to decrease an amount of sulfur existing in a surface area of the magnetic layer.

The amount of the polar group introduced in the binder may be suitably in the range of 0.03 to 0.3 millimole per one gram of a total amount of the binder. When the amount of the polar group is less than 0.03 millimole, the dispersibility of the solid particles in the binder cannot be enhanced to a sufficient extent. On the other hand, when the amount of the polar group is greater than 0.3 millimole, the recording medium exhibits not only a high moisture-absorptivity and a poor weathering resistance but also deteriorated dispersibility of the magnetic powder in the binder. A single kind or different kinds of the polar groups may be introduced in the binder.

Polyisocyanate may be added as a curing agent to the binder to form a cross-linking structure therein.

Examples of suitable polyisocyanate include isocyanates such as tolylene diisocyanate, 4,4'-diphenylmethane diisocyanate, hexamethylene diisocyanate, xylene diisocyanate and isophorone diisocyanate, adducts of these isocyanates with polyhydric alcohol such as trimethylol propane, condensates of these isocyanates, or the like.

The magnetic layer may be formed by dispersing the above-mentioned ferromagnetic powder and binder in an organic solvent, mixing them together to prepare a magnetic coating composition and applying the magnetic coating composition onto a non-magnetic substrate, followed by drying.

Examples of the suitable solvent used to prepare the magnetic coating composition, may include ketones such as methyl ethyl ketone and cyclohexanone, alcohol such as methanol and isopropyl alcohol, esters such as ethyl acetate and butyl acetate, aromatic hydrocarbons such as toluene and benzene, chlorinated hydrocarbon such as carbon tetrachloride and chloroform, ethers such as dioxane and diethylene glycol monoethyl ether, or the like.

The magnetic layer may further contain various additives such as an abrasive and a lubricant together with the ferromagnetic powder and the binder.

Typical examples of the lubricants may include higher fatty acids such as myristic acid, palmitic acid, stearic acid and oleic acid, metal salts or amine salts of these higher fatty acids, ester compounds of fatty acid and monohydric alcohol, and the like. Among them, the ester compound of the higher fatty acid is particularly preferable.

The preferred ester compound of the higher fatty acid may include, for example, those prepared from a monobasic fatty acid containing 10 to 24 carbon atoms and a monohydric alcohol containing 1 to 18 carbon atoms, or a monoalkyl ether of alkylene oxide, or the like. In the above, the monobasic acid and the monohydric alcohol may be linear or branched, and saturated or unsaturated ones.

Examples of these ester compounds may include methyl stearate, ethyl stearate, propyl stearate, butyl stearate, sec-butyl stearate, tert-butyl stearate, isobutyl stearate, pentyl stearate, heptyl stearate, octyl stearate, butoxyethyl stearate, butyl palmitate, pentyl palmitate, heptyl palmitate, octyl palmitate, isooctyl palmitate, octyl myristate, oleyl oleate, or the like.

Further, suitable lubricants may include ester compounds of fatty acid and polyhydric alcohol having 2 to 6 hydroxyl groups, silicone oil modified with fatty acid or the like, or alkyl phosphate esters. These compounds may contain an ether bond or other substituents by adding ethylene oxide thereto, or a part of the compound may contain fluorine. Furthermore, perfluoroethers or modified products thereof and solid lubricants such as molybdenum disulfide and graphite are suitably used as the lubricant.

The addition of the lubricants into the magnetic coating composition can be performed at any of the initial, middle and terminal stages of the mixing and dispersing process of preparing the magnetic coating composition. In addition, the lubricant may be applied as a top-coating layer onto the magnetic layer.

In the event that the lubricant is added to the magnetic coating composition, it is preferred that an amount of the lubricant added be in the range of from 1.5 to 3.0 parts by weight based on 100 parts by weight of the ferromagnetic powder. When the amount of the lubricant added is less than 1.5 parts by weight, a sufficient lubricating effect cannot be obtained. On the other hand, when the amount exceeds 3.0 parts by weight, the recording medium exhibits an increased friction upon a low-speed transportation thereof due to an excess amount of the lubricant added.

Examples of the abrasive may include alumina, chromium oxide, titanium oxide, α-iron oxide, silicon carbide, corundum, (artificial) diamond, or the like.

The abrasive in the form of powder can be directly added to the magnetic coating composition. Alternatively, the abrasive is first formed into a slurry separately from the ferromagnetic powder and then the abrasive-containing slurry can be added to the magnetic coating composition. The addition of the abrasive-containing slurry into the magnetic coating composition can be performed at any of initial, middle and terminal stages of the mixing and dispersing process of the magnetic coating composition.

In addition to the above-mentioned abrasive and lubricants, the magnetic coating composition may contain known various additives such as an antistatic material e.g., carbon black, a light-shielding material, an antifrictional material, a dispersant, a cross-linking agent, a plasticizer, or the like.

In a case where, among the additives illustrated above, the non-magnetic solid powder such as the abrasive, carbon black, molybdenum disulfide, graphite is added into the magnetic coating composition, a weight ratio of a sum of these non-magnetic and magnetic solid powders to the binder, namely a ratio of the non-magnetic solid powder plus the magnetic powder to the binder, is suitably in the range of 5.75 to 6.75. This is because a surface of the magnetic layer should have an appropriate volume of voids or pores.

In the case of the magnetic layer containing such a non-magnetic solid powder, when the content of the solid powder exceeds a predetermined value, voids or pores are formed therein. In this case, if the lubricant is contained in such a magnetic layer containing voids or pores, the lubricant not only exists in a surface area thereof but also is received in the voids or pores. The lubricant existing in the surface area of the magnetic layer is consumed upon occurring the slide contact of the recording medium with a magnetic head. However, the lubricant is continuously supplied from the voids or pores so that an appropriate amount of the lubricant exists between the surface of the magnetic layer of the magnetic recording medium and the magnetic head. Accordingly, a good travelling performance and a good durability of the magnetic recording medium is maintained for a long period of time. A lower limit of the above-mentioned weight ratio of the sum of the non-magnetic solid powder plus the magnetic powder to the binder, is determined by a minimum amount of the non-magnetic solid powder below which the lubricating effect is no longer obtained.

On the other hand, an upper limit of the above-mentioned weight ratio of the sum of the non-magnetic solid powder plus the magnetic powder to the binder, is determined as a predetermined value obtained by taking into account a mutual relation between the dispersion of the magnetic coating composition, the lubricating effect, the packing density of the ferromagnetic powder and the mechanical strength of the magnetic layer. When the weight ratio of the sum of the non-magnetic solid powder plus the magnetic powder to the binder exceeds 6.75, an amount of the binder absorbed to the ferromagnetic powder is decreased so that the dispersing stability of the magnetic coating composition and the packing density of the ferromagnetic powder are deteriorated. In addition, when the weight ratio is too large, an excess volume of voids or pores are undesirably formed in the magnetic layer. As a result, an amount of the lubricant absorbed into the voids or pores increases to a great extent so that an amount of the lubricant to be supplied to the surface area of the magnetic layer correspondingly decreases, resulting in failure to effectively utilize the lubricant contained in the magnetic layer. Further, formation of too much voids or pores in the magnetic layer leads to considerably deteriorated mechanical strength thereof whereby there occur problems concerning the electromagnetic conversion characteristic and durability of the recording medium.

The magnetic layer is prepared from the above-mentioned magnetic coating composition. However, the magnetic layer may be in the form of a single-layered structure or a multi-layered structure having 2 or more layers each composed of the above-mentioned magnetic coating composition.

In order to achieve prevention of the spacing loss and improvement in the electromagnetic conversion characteristic, it is preferred that the magnetic layer has a surface roughness Ra of 5.0 nm or less and a surface roughness Rz of 70 nm or less. Here, the surface roughness Ra means a center-line average roughness and the surface roughness Rz means ten-point average roughness both prescribed according to JIS-B0601.

A suitable surface roughness of the magnetic layer is achieved by selecting such materials and processes as being capable of forming a mirror-polishing surface.

That is, as the powdery components including the ferromagnetic powder, the abrasive and the like, there are selected those which are finely pulverized and easy to be dispersed. The suitable binders may be those which exhibit a good absorptivity to these powdery components, particularly the ferromagnetic powder. For example, such binders include those into which is introduced an appropriate polar group compatible, in its amount and kind, with a surface condition of the ferromagnetic powder such that the ferromagnetic powder can be homogeneously dispersed in the binder. As the suitable non-magnetic substrate used as a backing layer, there are selected those having a good surface condition.

Upon forming of the magnetic layer, an appropriate selection of dispersing conditions such as a dispersing apparatus, a dispersing time and the like, should be made to obtain a high shearing force. Further, a pressure or a temperature used in the calendar treatment is set to relatively high values. Furthermore, a known mirror-polishing treatment may be used together with the above-mentioned processes while taking into account a balance between a travelling performance, a productivity and other properties of the resultant recording medium.

Examples of suitable substrates used for forming the magnetic recording medium according to the present invention may include polyesters such as polyethylene terephthalate and polyethylene naphthalate, polyamides such as aramid resins or polyimides, polyolefins such as polypropylene, cellulose such as cellulose triacetate, polycarbonates, other plastics, metals such as aluminum, glass or other ceramics, or the like.

An essential construction of the magnetic recording medium according to the present invention is described above but further changes or modifications thereto are possible without departing from the scope of the present invention.

For example, a back-coating layer composed primarily of non-magnetic or magnetic powder and the binder can be provided on the opposite surface of the substrate to the side where the magnetic layer is formed.

Examples of suitable non-magnetic powder for the back-coating layer may include, generally a material composed essentially of carbon black, specifically calcium carbonate, alumina, titanium oxide, α-iron oxide, or the like. On the other hand, examples of suitable magnetic powder for the back-coating layer may include those used in the production of the magnetic layer above. These non-magnetic and magnetic powders can be used singly or in the form of a mixture of 2 or more different powders.

In addition, an undercoating layer can be provided between the non-magnetic substrate and the magnetic layer. In this case, the undercoating layer may be composed primarily of a fine non-magnetic or magnetic powder such as α-iron oxide, carbon black, titanium oxide, calcium carbonate, alumina or the like, and a binder.

In the case where such back-coating and/or undercoating layers are provided, the binders illustrated above for the magnetic layer can be also used as a binder for these layers singly or in the form of a mixture.

The present invention is described in more detail below by way of examples and comparative examples, but the examples are not intended to limit the present invention.

EXAMPLE 1

A magnetic powder (magnetic powder No. 1) having the following properties and characteristics was first prepared.

Sulfate ion extracted: $4 \times 10^{-6}$ g per 1 g of the magnetic powder;

Average particle size (average major axis length): 0.13 μm;

Content of cobalt based on iron: 10.1 atomic %;

Specific surface area: 56.9 m$^2$/g; and

Coercive force Hc: 132 kA/m.

Meanwhile, the magnetic powder No. 1 was prepared from iron sulfate as a starting material and a sulfur component was removed by washing at a stage of gerthite.

The amount of sulfate ion extracted was measured in the following manner.

Namely, 3.0 g of the magnetic powder No. 1 as a ferromagnetic powder sample was added into 65 milliliters of hot water having a temperature of 90° C. and immersed therein for one hour. An additional amount of water was added to the mixture so that a total volume of the mixture was 100 milliliters. The mixture was then filtered to remove the ferromagnetic sample and subjected to a measurement of sulfate ion extracted by using ion chromatography.

The magnetic powder No. 1 was mixed with a binder, additives including an abrasive and a lubricant, and solvent as shown in Table 1 below. The mixture was then dispersed and mixed together by using a sand mill to prepare a magnetic coating composition.

TABLE 1

| | INGREDIENT | AMOUNT (part by weight) |
|---|---|---|
| MAGNETIC POWDER | Magnetic powder No. 1 | 100 |
| BINDER | Polyester-Polyurethane: Number-average molecular weight = 21000, Polar group; Sodium sulfonate salt (0.12 mmol/g), Main component of polyester; isophthalic acid-ethylene glycol, Urethane-modified isocyanate; diphenylmethane diisocyanate | 6 |
| | Vinyl chloride-series copolymer: Average polymerization degree = 305, Polar group; potassium sulfate salt (0.08 mmol/g), Other essential substituents; epoxy group (0.8 mmol/g), hydroxyl group (0.3 mmol/g) | 12 |
| ADDITIVE | Alumina powder: α ratio = 85%, Average particle size = 0.5 μm | 8 |
| | Nitro-triacetic acid | 3.0 |
| | Stearic acid | 1.5 |
| | Butyl stearate | 2 |
| SOLVENT | Methyl-ethyl ketone | 120 |
| | Toluene | 60 |
| | Cyclohexanone | 60 |

The thus prepared magnetic coating composition was further blended with 3 parts by weight of a curing agent (Tradename: Colonate L manufactured by Nippon Polyurethane Industry Co., Ltd.) based on 100 parts by weight of the magnetic powder. The blended composition was coated over a polyethylene terephthalate film having a thickness of 7.5 μm in such an amount that a coating layer having a thickness of 2.5 μm was obtained after drying. The coating layer which still remained uncured is exposed to a magnetic field to magnetically orient the magnetic powder therein along a predetermined direction. The coating layer was dried and then subjected to a calendar treatment and finally a curing treatment, the latter treatment being carried out at a temperature of 60° C. for 20 hours, so that a magnetic layer having a thickness of 2.5 μm was formed on the polyethylene terephthalate film.

On the other hand, the polyethylene terephthalate film was provided, on a back surface thereof opposite to the surface on which the magnetic layer is formed, with a back-coating layer having a thickness of 0.5 μm and a composition shown in Table 2 below.

TABLE 2

| INGREDIENT | | | AMOUNT (part by weight) |
|---|---|---|---|
| PIGMENT | Carbon black-1 | Average particle size = 0.02 μm, DBP* oil absorption = 105 cc/100 g | 95 |
| | Carbon black-2 | Average particle size = 0.35 μm, DBP* oil absorption = 40 cc/100 g | 3 |
| | Titanium oxide | Average particle size = 0.4 μm | 2 |
| BINDER | Polyester-Polyurethane: Number-average molecular weight = 24000, Polar group; Sodium sulfonate salt (0.08 mmol/g), Main component of polyester; adipic acid-neopentyl glycol, ethylene glycol, Urethane-modified isocyanate; diphenylmethane diisocyanate | | 50 |
| | Nitro-cellulose: CELNOVA BTH 1/2 (Asahi Chemical Industry Co., Ltd.) | | 30 |
| CURING AGENT | Polyisocyanate: COLONATE L (Nippon polyurethane Industry Co., Ltd.) | | 10 |

Note: DBP with the asterisk (*) indicates "dibutyl phthalate."

The thus prepared wide original band sheet having the magnetic layer and the back-coating layer on the base film was cut into individual tapes each having a width of 8 mm to obtain sample tapes. The sample tape was incorporated in a case to form a Hi-8 video tape cassette.

EXAMPLE 2

Example 1 was repeated in the same manner as described above except that the magnetic coating composition was prepared by using the magnetic powder (magnetic powder No. 2) having the amount of sulfate ion extracted, the average major axis length, the cobalt content based on iron, the specific surface area and the coercive force as enumerated in Table 3 below. A sample tape was prepared by using the magnetic coating composition and incorporated into a Hi-8 video tape cassette.

EXAMPLE 3

Example 1 was repeated in the same manner except that the magnetic coating composition was prepared by using a magnetic powder (magnetic powder No. 2) having such an amount of sulfate ion extracted, an average major axis length, a content of cobalt based on iron, a specific surface area and a coercive force as enumerated in Table 3 below, and a binder containing 6 parts by weight of polyester-polyurethane resin and 12 parts by weight of vinyl chloride-series copolymer as indicated below. A sample tape was prepared by using the magnetic coating composition and incorporated in a Hi-8 video tape cassette.

Polyester-Polyurethane

Number-average molecular weight: 19,000

Polar group: Tertiary amine; 0.08 millimole/g

Essential component of the polyester moiety: Isophthalic acid-ethylene glycol

Urethane-modified isocyanate: Diphenylmethane-diisocyanate Vinyl Chloride-Series Copolymer:

Average polymerization degree: 300

Polar group: Quaternary ammonium bromide; 0.12 millimole/g

Other substituent(s): Hydroxyl group; 0.5 millimole/g

EXAMPLE 4

Example 1 was repeated in the same manner as described above except that the magnetic coating composition was prepared by using a magnetic powder (magnetic powder No. 3) having the amount of sulfate ion extracted, the average major axis length, the cobalt content based on iron, the specific surface area and the coercive force as enumerated in Table 3 below, and that the calendar treatment on the magnetic layer was carried out two times. A sample tape was prepared by using the magnetic coating composition and incorporated into a Hi-8 video tape cassette.

Comparative Example 1

Example 1 was repeated in the same manner as described above except that the magnetic coating composition was prepared by using the same magnetic powder (magnetic powder No. 3) as used in Example 3. A sample tape was prepared by using the magnetic coating composition and incorporated into a Hi-8 video tape cassette.

Comparative Example 2

Example 1 was repeated in the same manner as described above except that the magnetic coating composition was prepared by using the same magnetic powder (magnetic powder No. 3) as used in Example 3 and the proportion of alumina was changed to 15 parts by weight. A sample tape was prepared by using the magnetic coating composition and incorporated into a Hi-8 video tape cassette.

TABLE 3

| | Magnetic Powder No. 1 | Magnetic Powder No. 2 | Magnetic Powder No. 3 |
|---|---|---|---|
| Amount of Sulfate Ion Extracted (μg/g) | 4 | 31 | 67 |
| Length of Major Axis (μm) | 0.13 | 0.25 | 0.26 |
| Cobalt Content (atomic %) | 10.1 | 0 | 0 |
| Specific Surface Area (m$^2$/g) | 56.9 | 59.3 | 58.6 |
| Coercive Force Hc (kA/m) | 132 | 128 | 129 |

Incidentally, in the above Examples and Comparative Examples, the amount of the sulfate ion extracted from the ferromagnetic powder was controlled by adjusting a degree of washing treatment at a stage of formation of gerthite.

The sample tape thus produced was subjected to measurements of the amount of the sulfate ion extracted per 1 m$^2$, the surface roughness Ra, an initial output of radio-frequency (hereinafter referred to as "RF") and an output loss of RF after tape travelling, which are used as an index of its electromagnetic conversion characteristics, and an abrasion loss of a magnetic head. The respective measurements are performed as follows.

Amount of Sulfate Ion Extracted per 1 m$^2$

The sample tape from which the back-coating layer was removed and which has a surface area of 0.15 m$^2$, was cut into tape pieces each having a size of 2 to 4 cm×2 to 4 cm and then immersed in 80 g of pure water having a temperature of 30° C. for one hour. The resultant extract was subjected to the measurement of the amount of the sulfate ion extracted by using an ion chromatography.

Surface Roughnesses Ra and Rz

The surface roughnesses Ra and Rz were measured by using a surface-roughness measuring apparatus (Tradename: ETB-30HK manufactured by Kosaka Kenkyusho K.K.) according to JIS-B0601.

An Initial Output of RF (radio-frequency) and an Output Loss of RF

Three reels of sample tapes were subjected to recording of 7 MHz signal which was carried out at room temperature for 5 minutes by using three Hi-8 video tape recorders. The recorded signal was reproduced upon which the RF value was measured as an initial RF output.

Next, an entire length (corresponding to 120 minute-recording length) of each of the sample tapes loaded in the video tape recorder was repeatedly travelled over a magnetic head ten times at a temperature of 40° C. and a relative humidity of 20%. Thereafter, a portion of the sample tape on which the signal was recorded for five minutes, was reproduced under the same conditions upon which the RF value was measured as a terminal RF output.

Values of the output loss were obtained by subtracting the terminal RF output from the initial RF output with respect to the sample tapes loaded in the respective three video tape recorders. An average value of the output loss was calculated from the three values of the output loss obtained by the respective sample tapes loaded in the three video tape recorders.

In the event that a fresh tape should be evaluated in the video tape recorder, a lapping tape head was travelled over the magnetic head to remove the deteriorated portion generated on the surface of the magnetic head whereby the magnetic head is cleaned.

Abrasion Loss of Magnetic Head

The magnetic head of each of the three Hi-8 video tape recorders was preliminarily measured with respect to a degree of projection of its tip ends projecting into a zone where it contacts the travelling magnetic tape. By using the three HI-8 video tape recorders, an entire length (corresponding to 120 minute-recording length) of each of the sample tapes were repeatedly travelled over the magnetic head 100 times at a temperature of 40° C. and a relative humidity of 80% in the same manner as above.

After causing the sample tapes to be travelled over the magnetic head in the above-mentioned manner, values of the degree of projection of each magnetic head were measured again. The abrasion loss of each of the magnetic heads was obtained by subtracting the value of the degree of projection after the tape travelling from that before the tape travelling. An average value of the abrasion loss was calculated from the values obtained with respect to the subtracted values of the three magnetic heads.

The thus measured values regarding the amount of the sulfate ion extracted per 1 m$^2$, surface roughnesses Ra, initial RF outputs and output losses of RF and an abrasion loss of the magnetic head are shown in Table 4.

TABLE 4

| Example No. | Amount of Sulfate Ion Extracted ($\mu$g/m$^2$) | Surface Roughness Ra (nm) | Output Loss of RF (dB) | Initial Output of RF (dB) | Abrasion Loss of Head ($\mu$m) |
| --- | --- | --- | --- | --- | --- |
| 1 | 31 | 3.6 | 0.4 | +2.1 | 0.6 |
| 2 | 53 | 5.1 | 0.9 | +0.1 | 1.0 |
| 3 | 44 | 5.3 | 0.4 | +0.3 | 1.2 |
| 4 | 94 | 4.9 | 1.1 | +0.6 | 1.1 |

TABLE 4-continued

| Example No. | Amount of Sulfate Ion Extracted ($\mu$g/m$^2$) | Surface Roughness Ra (nm) | Output Loss of RF (dB) | Initial Output of RF (dB) | Abrasion Loss of Head ($\mu$m) |
| --- | --- | --- | --- | --- | --- |
| Comp. 1* | 167 | 5.4 | 2.2 | 0 | 1.4 |
| Comp. 2* | 181 | 6.3 | 1.2 | -0.6 | 3.2 |

Note: The asterisk (*) indicates comparative examples.

In Table 4, the indicated values of "dB" are relative values obtained when the initial RF output of the sample tape used in Comparative Example 3, is regarded as "0 dB."

The preferred values of the respective characteristics are 10 dB or lower for the RF output loss, +1.0 dB or greater for initial RF output and 2 $\mu$m or less for the abrasion loss of magnetic head.

As will be noted from Table 4, the amounts of the sulfate extracted per 1 m$^2$ of the respective sample tapes are different from each other.

That is, with respect to the sample tapes of Examples 1 and 2 and Comparative Example 1, there were used different ferromagnetic powders which were different in the amount of the sulfate ion extracted per one gram thereof from each other, though the other tape-preparing procedures were the same for all the ferromagnetic powders. By the comparison between these values, it will be noted that the amount of sulfate ion extracted per 1 m$^2$ of each sample tape becomes smaller as the amount of sulfate ion extracted per one gram of each ferromagnetic powder used for preparation of the sample tape decreases.

On the other hand, with respect to the sample tapes of Examples 2 and 3, the respective binders are different in the kinds of the polar groups introduced thereinto from each other. In this case, it will be noted that the amount of sulfate ion extracted per 1 m$^2$ of the sample tape of Example 3 into which an amine-series polar group is introduced, is smaller than that of Example 2 into which a sulfonate polar group and a sulfate polar group are introduced.

Further, with respect to the sample tapes of Example 4 and Comparative Example 1, these sample tapes are different in repeated number of the calendar treatment performed on the surface of the magnetic layer from each other. It will be noted that the amount of the sulfate ion extracted per 1 m$^2$ of the sample tape of Example 4 in which the calendar treatment was carried out two times and the ferromagnetic powder exhibiting a relatively large amount of sulfate ion extracted was used, is smaller than that of Comparative Example 1 in which no calendar treatment was performed.

Accordingly, it will be appreciated from the above that the amount of the sulfate ion extracted per 1 m$^2$ of the magnetic recording medium can be reduced by using such a ferromagnetic powder and a binder as being small in sulfur content and repeatedly performing the calendar treatment much times on the surface of the magnetic layer. The reason why the repeated calendar treatment is effective for reduction of the amount of the sulfate ion extracted, is that the voids or pores existing in the surface area of the magnetic layer are closed or plugged by the treatment so that the sulfur component inside the magnetic layer is difficult to be transferred onto the surface thereof.

The comparison regarding various properties of the sample tapes reveals that the sample tapes of Examples 1 to 4 in which the amounts of the sulfate ion extracted per 1 m$^2$ were 100 μg or less, exhibit smaller RF output losses than those of Comparative Examples 1 and 2 in which the amounts of the sulfate ion extracted per 1 m² exceeds 100 μg.

This indicates that restricting the amount of the sulfate ion extracted per 1 m² is an effective measure to prevent deterioration of the electromagnetic conversion characteristic when the magnetic recording medium is subjected to repeated travelling over the magnetic head. Even from the comparison between the Examples of the present invention, it is recognized that the sample tapes of Example 1 in which the amount of the sulfate ion extracted per 1 m² was 31 μg, exhibits a smaller RF output loss than that of Example 4 in which the amount of the sulfate ion extracted per 1 m² was 44 μg. Accordingly, a preferred range of the amount of the sulfate ion extracted per 1 m² is 50 μg/m² or less.

Meanwhile, from the comparison between Comparative Examples 1 and 2, it will be noted that the sample tape of Comparative Example 2 exhibits a smaller RF output loss than that of Comparative Example 1 nevertheless the former is greater in the amount of the sulfate ion extracted than that of the latter. In our suggestion, this is because the sample tape of Comparative Example 2 contained much larger amount of abrasive than the sample tape of Comparative Example 1 so that the deteriorated portion formed on the surface of the magnetic head is ground and removed by the contact with the abrasive-containing tape. However, it is expected that, when the sample tape of Comparative Example 2 was repeatedly travelled over the magnetic head, the magnetic head is susceptible to a severe wear due to the contact with the sample tape so that a service life of the magnetic head would be undesirably short. From this standpoint, the measure that the abrasive is incorporated in the magnetic layer is less advantageous than the measure that the amount of the sulfate ion extracted from the medium is limited to the predetermined range.

With regard to the surface roughness Ra of the surface of the magnetic layer and the average major axis length of particles of the ferromagnetic powder, the relation therebetween is that the surface roughness Ra becomes small as the average major axis length of the powder becomes short and the number of repetition of the calendar treatment increases, as will be noted from the results regarding the sample tapes of Examples 1 and 4. In this regard, it is appreciated that the initial RF outputs of these sample tapes are large as compared with those of the sample tapes obtained in other Examples and Comparative Examples.

Accordingly, by restricting the amount of the sulfate ion extracted to the predetermined range, the deterioration of the electromagnetic conversion characteristic of the magnetic recording medium is effectively prevented. Further, when the surface roughness Ra of the magnetic layer is restricted to a small value, the initial electromagnetic conversion characteristic is improved whereby an extremely excellent magnetic recording medium can be obtained.

Ferromagnetic Powder

In the above discussion, it is recognized that the amount of the sulfate ion extracted per 1 m² of the magnetic recording medium is controllable by adjusting the sulfur content in the magnetic coating composition and the surface condition of the magnetic layer. Consequently, a particular examination is now made on an acceptable sulfur content of the ferromagnetic powder.

First, the amount of the sulfate ion extracted, the average major axis length, the cobalt content based on iron, the specific surface area and the coercive force of the ferromagnetic powder used are tabulated in Table 5.

TABLE 5

| MP No.* | Amount of Sulfate Ion Extracted (μg/g) | Length of Major Axis (μm) | Cobalt Content (atomic %) | Specific Surface Area (m²/g) | Coercive Force Hc (kA/m) |
|---|---|---|---|---|---|
| 4  | 18 | 0.14 | 20.3 | 59.4 | 131 |
| 5  | 4  | 0.15 | 19.1 | 61.1 | 132 |
| 6  | 16 | 0.11 | 19.8 | 63.4 | 132 |
| 7  | 6  | 0.09 | 21.4 | 62.6 | 130 |
| 8  | 5  | 0.21 | 20.8 | 59.6 | 131 |
| 9  | 7  | 0.13 | 28.9 | 60.5 | 131 |
| 10 | 2  | 0.14 | 10.2 | 58.0 | 135 |
| 11 | 6  | 0.19 | 5.2  | 59.2 | 132 |
| 12 | 6  | 0.26 | 5.0  | 57.1 | 133 |
| 13 | 9  | 0.22 | 0    | 57.4 | 127 |
| 14 | 11 | 0.27 | 0    | 58.0 | 128 |
| 15 | 31 | 0.14 | 20.3 | 60.5 | 130 |
| 16 | 57 | 0.20 | 5.9  | 59.9 | 131 |
| 17 | 64 | 0.27 | 0    | 57.4 | 129 |

Note: The asterisk (*) indicates Magnetic Powder No.

Experiments 1 to 16

In each of Experiments 1 to 16, Example 1 was repeated in the same manner as described above except that the magnetic coating composition was prepared by using each of the magnetic powders Nos. 4 to 17 enumerated in Table 5 instead of the magnetic powder No. 1, and using the binder, the additives including the abrasive and the solvent as shown in Table 6. The individual sample tapes thus prepared were incorporated in Hi-8 video tape cassette. Incidentally, the kind of the ferromagnetic powder and the content A of the abrasive used in each of the Experiments 1 to 16 are shown in Table 7.

TABLE 6

| INGREDIENT | | AMOUNT (part by weight) |
|---|---|---|
| MAGNETIC POWDER | | 100 |
| BINDER | Polyester-Polyurethane: Number-average molecular weight = 21000, Polar group; Sodium sulfonate salt (0.12 mmol/g), Main component of polyester; isophthalic acid-ethylene glycol, Urethane-modified isocyanate; diphenylmethane diisocyanate | 6 |
| | Vinyl chloride-series copolymer: Average polymerization degree = 305, Polar group; potassium sulfate salt (0.08 mmol/g), Other essential substituents; epoxy group (0.8 mmol/g), hydroxyl group (0.3 mmol/g) | 12 |
| ABRASIVE | Alumina powder: α ratio = 85%, Average particle size = 0.5 μm | A |
| ADDITIVE | Stearic acid | 1.5 |
| | Butyl stearate | 2 |
| SOLVENT | Methyl-ethyl ketone | 120 |
| | Toluene | 60 |
| | Cyclohexanone | 60 |

TABLE 7

| Experiment No. | Magnetic Powder | Amount A of Abrasive (part by weight) |
| --- | --- | --- |
| 1 | 4 | 8 |
| 2 | 5 | 8 |
| 3 | 6 | 8 |
| 4 | 7 | 8 |
| 5 | 8 | 8 |
| 6 | 9 | 8 |
| 7 | 10 | 8 |
| 8 | 11 | 8 |
| 9 | 12 | 8 |
| 10 | 13 | 8 |
| 11 | 14 | 8 |
| 12 | 15 | 8 |
| 13 | 16 | 8 |
| 14 | 17 | 8 |
| 15 | 15 | 15 |
| 16 | 16 | 15 |

The sample tapes thus prepared were measured in the same manner as described above with respect to the surface roughness Ra, the surface roughness Rz, the initial RF output, the RF output loss after travelling over the magnetic head and the abrasion loss of the magnetic head. The results are shown in Table 8.

TABLE 8

| Experiment No. | Ra* (nm) | Rz** (nm) | Output Loss of RF (dB) | Initial Output of RF (dB) | Abrasion Loss of Head ($\mu$m) |
| --- | --- | --- | --- | --- | --- |
| 1 | 3.9 | 51 | 0.6 | +2.1 | 0.4 |
| 2 | 3.6 | 46 | 0.5 | +2.1 | 0.5 |
| 3 | 3.2 | 43 | 0.8 | +2.3 | 0.4 |
| 4 | 3.4 | 47 | 0.5 | +2.4 | 0.4 |
| 5 | 4.2 | 52 | 0.5 | +1.4 | 0.7 |
| 6 | 3.8 | 44 | 0.7 | +2.7 | 0.5 |
| 7 | 4.0 | 48 | 0.6 | +1.6 | 0.6 |
| 8 | 4.7 | 52 | 0.4 | +1.2 | 0.7 |
| 9 | 5.1 | 74 | 0.4 | +0.4 | 0.9 |
| 10 | 4.9 | 58 | 0.5 | +0.6 | 0.6 |
| 11 | 5.5 | 69 | 0.4 | +0.2 | 0.8 |
| 12 | 4.5 | 51 | 1.5 | +1.9 | 0.6 |
| 13 | 4.8 | 64 | 2.4 | +1.1 | 0.7 |
| 14 | 5.4 | 72 | 2.1 | 0 | 0.7 |
| 15 | 5.4 | 68 | 0.9 | +1.4 | 2.9 |
| 16 | 6.1 | 79 | 0.7 | +0.9 | 3.8 |

Note: Ra* and Rz** indicate center line-average surface roughness and ten-point average surface roughness.

As shown in Table 8, the sample tapes obtained in Experiments 1 to 11 and prepared by using the ferromagnetic powders which are small in amounts of the sulfate ion extracted per 1 g, particularly 20.0 $\mu$g or less per 1 g, exhibit smaller RF output losses than the sample tapes obtained in Experiments 12 to 14 in which the amount of the sulfate ion extracted per 1 g of the ferromagnetic powder exceeds 20.0 $\mu$g, but the content of the abrasive is the same as those of Experiments 1 to 11.

It is suitable that the ferromagnetic powders exhibiting the amount of the sulfate ion extracted per 1 g of 20.0 $\mu$g or less are selectively used.

The fact that other factors than the amount of the sulfate ion extracted do not contribute to the effect of preventing the deterioration of the electromagnetic conversion characteristic, can be recognized by comparing the sample tapes of Experiments 1 and 2 with that of Experiment 12, all of which are approximately the same in the major axis length of particles of the ferromagnetic powder used and the cobalt content based on iron. Similarly, the comparison between Experiments 8 and 13 and between Experiments 11 and 14, reveals that the sample tapes, which are smaller in amounts of the sulfate ion extracted (Experiment 8 or 11), exhibit less RF output losses than those which are large in amounts of the sulfate ion extracted (Experiment 13 or 14), nevertheless the average major axis length and the cobalt content based on iron of the ferromagnetic powders used are almost the same.

On the other hand, when the comparison is made between the sample tapes using the ferromagnetic powders which exhibit the amount of the sulfate ion extracted exceeding 20.0 $\mu$g per 1 g, the sample tapes containing a larger amount of the abrasive (Experiments 15 and 16) show a relatively low value of the RF output loss as compared with the other sample tapes containing a small amount of the abrasive (Experiments 1 to 11). However, the sample tapes having a larger content of the abrasive causes extremely large abrasion loss of the magnetic head so that it is expected that a life time of the magnetic head becomes short.

Next, further investigation is made on an appropriate composition of the ferromagnetic powder and an appropriate value of the average major axis length of particles thereof.

In order to determine the effect obtained by the addition of cobalt in the ferromagnetic powder, the comparison was made between data of Experiments 1, 2, 6 and 7 in which the ferromagnetic powders having almost the same major axis length but different cobalt contents were employed, and further between data of Experiments 8 and 9 and data of Experiments 10 and 11 in the latter pair of which the ferromagnetic powders having no cobalt content were employed. From the results of the comparison, it is recognized that there is a tendency that the sample tapes using the ferromagnetic powders with a high cobalt content exhibit a larger initial RF output than those using the ferromagnetic powder with little or no cobalt content. Accordingly, it is preferred that the ferromagnetic powder contains an appropriate amount of cobalt.

Next, in order to determine an optimum value of the average major axis length of particles of the ferromagnetic powder, still further comparison is made between data of Experiments 1, 2, 3, 4 and 5 in which the ferromagnetic powders having different average major axis length but almost the same cobalt content were employed. Similar comparison is also made between data of Experiments 8 and 9 and between data of Experiments 10 and 11. From the result of these comparisons, it is recognized that there is a tendency that the sample tapes using the ferromagnetic powders with a shorter average major axis length exhibit greater initial RF outputs than those using the ferromagnetic powders with a longer average major axis length. Especially, when the ferromagnetic powders having an average major axis length of 0.2 $\mu$m or less are used, the sample tape having a relatively high initial RF output can be obtained.

As is apparent from the above discussion, it is suitable that the ferromagnetic powder used exhibits the amount of the sulfate ion extracted of $20.0 \times 10^{-6}$ g/1 g, and has an appropriate cobalt content and an average major axis length of 0.20 $\mu$m or less.

Additives

Various additives including a lubricant and an abrasive may be added to the magnetic layer to improve a travelling performance and a durability of the magnetic recording medium. In the following, the kind and the proportion of the additives are investigated.

First, the amount of the sulfate ion extracted, the average major axis length, the specific surface area and the coercive force of the ferromagnetic powder into which the additives are added, are tabulated in Table 9.

TABLE 9

| No.* | Amount of Sulfate Ion Extracted (µg/g) | Length of Major Axis (µm) | Surface Roughness (m²/g) | Coercive Force Hc (kA/m) | Constituent |
|---|---|---|---|---|---|
| 17 | 8 | 0.27 | 55.4 | 126 | (1) |
| 18 | 18 | 0.25 | 54.9 | 129 | (2) |
| 19 | 4 | 0.13 | 58.4 | 134 | (3) |
| 20 | 34 | 0.28 | 55.9 | 131 | (4) |
| 21 | 67 | 0.28 | 55.8 | 129 | (5) |

Note: The asterisk (*) indicates "magnetic powder number." The constituents (1), (2), (4) and (5) of the respective magnetic powders Nos. 17, 18, 20 and 21 represent an iron-series metal ferromagnetic powder which contains aluminum.

The constituent (3) of the magnetic powder No. 19 represents an iron-cobalt alloy ferromagnetic powder (cobalt content=10 atomic %) which contains aluminum-yttrium.

Experiments 17 to 39

In each of Experiments 17 to 39, Example 1 was repeated in the same manner as described above except that the magnetic coating composition was prepared by using each of the magnetic powders Nos. 17 to 21 enumerated in Table 9 instead of the magnetic powder No. 1, and using the composition as shown in Tables 10 and 11. The individual sample tapes thus prepared were incorporated in Hi-8 video tape cassette. Incidentally, the kind of the ferromagnetic powder, the blending proportion of the binder, the kind and the blending proportion of a higher fatty acid ester and the blending proportion of the abrasive were changed to those shown in Tables 10 and 11.

TABLE 10

| Ex. No. (1) | MP No. (2) | Amount of SI (3) | PEPU (4) | VC (5) | AB (6) | IP/B (7) | HFAE (8) | Content of HFAE (part by weight) |
|---|---|---|---|---|---|---|---|---|
| 17 | 17 | 8 | 6 | 12 | 8 | 6.0 | HeSA (9) | 2 |
| 18 | 17 | 8 | 6.2 | 12.5 | 8 | 5.78 | HeSA | 2 |
| 19 | 17 | 8 | 5.3 | 10.7 | 8 | 6.75 | HeSA | 2 |
| 20 | 17 | 8 | 6 | 12 | 12 | 6.22 | HeSA | 2 |
| 21 | 18 | 18 | 6 | 12 | 8 | 6.0 | HeSA | 2 |
| 22 | 19 | 4 | 6 | 12 | 8 | 6.0 | HeSA | 2 |
| 23 | 19 | 4 | 6.2 | 12.5 | 8 | 5.78 | HeSA | 2 |
| 24 | 19 | 4 | 5.3 | 10.7 | 8 | 6.75 | HeSA | 2 |
| 25 | 17 | 8 | 6 | 12 | 8 | 6.0 | HeSA | 1.5 |
| 26 | 17 | 8 | 6 | 12 | 8 | 6.0 | HeSA | 3 |
| 27 | 17 | 8 | 6 | 12 | 8 | 6.0 | NpSA (10) | 2 |
| 28 | 17 | 8 | 6 | 12 | 8 | 6.0 | BuSA (11) | 2 |

Note
(1): Experiment No.
(2): Magnetic Powder No.
(3): The amount represents an amount of sulfate ion extracted and the unit is (µg/g).
(4): Content of polyester-polyurethane (part by weight)
(5): Content of vinyl chloride-series copolymer (part by weight)
(6): Content of abrasive (part by weight)
(7): Ratio of an inorganic pigment to a binder
(8): Kind of higher fatty acid ester (HFAE)
(9): HeSA represents "heptyl stearate."
(10): NpSA represents "neopentyl stearate."
(11): BuSA represents "butyl stearate."

TABLE 11

| Ex. No. (1) | MP No. (2) | Amount of SI (3) | PEPU (4) | VC (5) | AB (6) | IP/B (7) | HFAE (8) | Content of HFAE (part by weight) |
|---|---|---|---|---|---|---|---|---|
| 29 | 17 | 8 | 6 | 12 | 8 | 6.0 | IoPA (9) | 2 |
| 30 | 17 | 8 | 6.5 | 13.1 | 8 | 5.51 | HeSA (10) | 2 |

TABLE 11-continued

| Ex. No. (1) | MP No. (2) | Amount of SI (3) | PEPU (4) | VC (5) | AB (6) | IP/B (7) | HFAE (8) | Content of HFAE (part by weight) |
|---|---|---|---|---|---|---|---|---|
| 31 | 17 | 8 | 5.1 | 10.3 | 8 | 7.01 | HeSA | 2 |
| 32 | 19 | 4 | 6.5 | 13.1 | 8 | 5.5 | HeSA | 2 |
| 33 | 19 | 4 | 5.1 | 10.3 | 8 | 7.0 | HeSA | 2 |
| 34 | 20 | 34 | 6 | 12 | 8 | 6.0 | HeSA | 2 |
| 35 | 21 | 67 | 6 | 12 | 8 | 6.0 | HeSA | 2 |
| 36 | 20 | 34 | 6 | 12 | 15 | 6.39 | HeSA | 2 |
| 37 | 21 | 67 | 6 | 12 | 15 | 6.39 | HeSA | 2 |
| 38 | 17 | 8 | 6 | 12 | 8 | 6.0 | HeSA | 1 |
| 39 | 17 | 8 | 6 | 12 | 8 | 6.0 | HeSA | 4 |

Note
(1): Experiment No.
(2): Magnetic Powder No.
(3): The amount represents an amount of sulfate ion extracted and the unit is ($\mu$g/g).
(4): Content of polyester-polyurethane (part by weight)
(5): Content of vinyl chloride-series copolymer (part by weight)
(6): Content of abrasive (part by weight)
(7): Ratio of an inorganic pigment to a binder
(8): Kind of higher fatty acid ester (HFAE)
(9): IoPA represents "isooctyl palmitate."
(10): HeSA represents "heptyl stearate."

The thus prepared sample tapes were measured with respect to a friction coefficient, a still-travelling durability (time), an RF output loss and an abrasion loss of a magnetic head. Among them, the measurements of the RF output loss and the abrasion loss of the magnetic head were performed in the same manner as described above. Whereas, the measurements of the frictional coefficient and the still-travelling durability were carried out under the following conditions:

Frictional Coefficient

The sample tape was repeatedly travelled through guide pins made of stainless steel (SUS304) having a diameter of 3 millimeters such that a surface of the magnetic layer comes into contact with the guide pins. The travelling was repeated 30 times after which the frictional coefficient was measured. The measuring conditions are shown below.

Temperature and Humidity: 40° C.; 80% (relative humidity)

Tape Travelling Speed: 20 mm/second

Load: 20 g

Wrapping Angle: 90°

Still-Travelling Durability

The sample tape was travelled at a temperature of 40° C. and a relative humidity of 80% through the Hi-8 video tape recorder which was modified to measure a still-travelling durability. A time (still-travelling time) required to attenuate the initial RF output by 3 dB, was measured. Meanwhile, if the initial RF output was not attenuated even after 360 minutes elapsed, the measurement was terminated. In this case, the still-travelling time of the sample tape was recorded as "360 minutes or more." The measurement was performed three times per one sample tape and an average value of the three measured values was determined as the still-travelling time for the sample tape measured.

The thus measured frictional coefficient, still-travelling time, RF output loss and abrasion loss of the magnetic head are shown in Tables 12 and 13 below.

TABLE 12

| Experiment No. | Frictional Coefficient | Time* (min.) | Output Loss of RF (dB) | Abrasion Loss of Head ($\mu$m) |
|---|---|---|---|---|
| 17 | 0.22 | 360 or more | 0.6 | 0.7 |
| 18 | 0.24 | 360 or more | 0.6 | 0.8 |
| 19 | 0.21 | 360 or more | 0.9 | 0.8 |
| 20 | 0.22 | 360 or more | 0.4 | 1.2 |
| 21 | 0.21 | 360 or more | 1.0 | 0.8 |
| 22 | 0.25 | 360 or more | 0.6 | 0.9 |
| 23 | 0.27 | 360 or more | 0.4 | 0.5 |
| 24 | 0.24 | 360 or more | 0.8 | 0.6 |
| 25 | 0.21 | 341 | 0.5 | 0.9 |
| 26 | 0.27 | 360 or more | 0.7 | 0.6 |
| 27 | 0.23 | 360 or more | 0.5 | 1.0 |
| 28 | 0.24 | 360 or more | 0.7 | 0.7 |

Note: The asterisk (*) indicates a still-travelling time (minute).

TABLE 13

| Experiment No. | Frictional Coefficient | Time* (min.) | Output Loss of RF (dB) | Abrasion Loss of Head ($\mu$m) |
|---|---|---|---|---|
| 29 | 0.25 | 360 or more | 0.8 | 0.6 |
| 30 | 0.20 | 83 | 0.7 | 0.4 |
| 31 | 0.22 | 108 | 1.1 | 0.8 |
| 32 | 0.31 | 74 | 0.3 | 0.3 |
| 33 | 0.26 | 121 | 0.7 | 0.5 |
| 34 | 0.23 | 360 or more | 2.1 | 0.7 |
| 35 | 0.24 | 360 or more | 2.8 | 0.9 |

TABLE 13-continued

| Experiment No. | Frictional Coefficient | Time* (min.) | Output Loss of RF (dB) | Abrasion Loss of Head ($\mu$m) |
|---|---|---|---|---|
| 36 | 0.22 | 360 or more | 0.9 | 3.3 |
| 37 | 0.20 | 360 or more | 1.6 | 4.1 |
| 38 | 0.21 | 94 | 0.8 | 0.9 |
| 39 | 0.56 | 253 | 1.0 | 0.5 |

Note: The asterisk (*) indicates a still-travelling time (minute).

The preferred frictional coefficient is 0.3 or less and the preferred still-travelling time is 240 minutes or greater.

The RF output loss was restricted to a low level when the ferromagnetic powders (magnetic powder Nos. 17 to 19) having an amount of sulfate ion extracted per one gram of 20.0 $\mu$g or less, were used. In addition, when the ferromagnetic powders having a high content of the abrasive were used, the sample tapes exhibited a relatively low RF output loss as noted from Experiments 20, 36 and 37. However, in this case, it is expected that an abrasion loss becomes large with elapsed time and a life time of the magnetic head becomes short. This is well-consistent with the results of the Experiments. As a result, it is appreciated that the present measure in which the ferromagnetic powder exhibiting the amount of the sulfate extracted per one gram of 20.0 $\mu$g or less is used, is extremely effective to prevent the deterioration of the electromagnetic conversion characteristic of the magnetic recording medium without shortening the life time of the magnetic head.

It is also noted from the results of measurements of frictional coefficient and still-travelling durability that these properties vary depending upon a sum of the non-magnetic solid powder and the magnetic powder, namely a weight ratio of an inorganic pigment to the binder or the content of the lubricant.

For example, when the weight ratio of the inorganic pigment to the binder is large as indicated by the sample tapes of Experiments 31 and 33, or to the contrary small as indicated by those of Experiments 30 and 32, the still-travelling time becomes short. Further, when the content of the lubricant is too large as indicated by the sample tapes of Experiment 39 and to the contrary too small as indicated by those of Experiment 38, the frictional coefficient becomes high and the still-travelling time thereof becomes short. Especially, the sample tape obtained in Experiment 39 has an extremely high frictional coefficient.

The preferred weight ratio of the inorganic pigment to the binder is in the range of 5.75 to 6.75 and the preferred content of the lubricant is in the range of 1.5 to 3.0 parts by weight based on 100 parts by weight of the ferromagnetic powder.

The sample tape of Experiment 25 which contains the a lower limit of the content of the higher fatty acid ester as the lubricant, exhibits rather short still-travelling time which is however long enough to meet the requirement of 240 minutes or longer. On the other hand, the sample tape of Experiment 26 which contains an upper limit of the content of the higher fatty acid ester as the lubricant, exhibits rather high frictional coefficient which is however a low value sufficient to meet the requirement of 0.3 or less.

As mentioned above, in accordance with the present invention, since the amount of the sulfate ion extracted per 1 m$^2$ of the magnetic recording medium is restricted to 100 $\mu$g or less when the medium is immersed in pure water of 30° C. for one hour, the magnetic recording medium can be repeatedly travelled over the magnetic head without occurring deterioration thereof whereby an initial electromagnetic conversion characteristic is maintained. Accordingly, the magnetic recording medium of the present invention exhibits an excellent recording and/or reproducing characteristic in a recording zone of a short wave length.

What is claimed is:

1. A magnetic recording medium comprising:
   a non-magnetic substrate having a surface; and
   at least one magnetic layer disposed on said surface, said at least one magnetic layer comprising:
   a ferromagnetic metal powder comprising iron and 10.0 atomic percent or more of cobalt based on iron, said ferromagnetic powder comprising particles having an average major axis length of 0.20 $\mu$m or less, and when the ferromagnetic powder is immersed in hot water having a temperature of 90° C. for one hour, 20.0 $\mu$g or less of sulfate ion is extracted per gram of said ferromagnetic metal powder;
   a non-magnetic powder comprising at least one member selected from the group consisting of: abrasives, and antistatic materials;
   from about 1.5 to about 3.0 parts by weight based on 100 parts by weight of said ferromagnetic powder of a lubricant; and
   a binder comprising from about 0.03 to about 0.3 millimoles per gram of a polar group selected from the group consisting of: —NR$_4$X, and —NR$_2$, wherein R is hydrogen or alkyl and X is halogen, the weight ratio of a sum of the non-magnetic powder and the ferromagnetic powder to said binder being in the range of from about 5.75:1 to about 6.75:1, said at least one magnetic layer having a surface roughness R$_a$ of about 5.0 nm or less and having a surface roughness R$_z$ of 70 nm or less, and when the magnetic recording medium is immersed in pure water at a temperature of 30° C. for one hour, 100 $\mu$g or less of sulfate ion is extracted per square meter of said magnetic recording medium.

2. A magnetic recording medium as defined in claim 1, wherein said non-magnetic substrate is a tape substrate.

3. A magnetic recording medium as defined in claim 1, wherein said non-magnetic substrate is a video tape substrate.

4. A magnetic recording medium as defined in claim 1, wherein said abrasives are selected from the group consisting of: alumina, chromium oxide, titanium oxide, $\alpha$-iron oxide, silicon carbide, and corundum.

5. A magnetic recording medium as defined in claim 1, wherein said lubricant is selected from the group consisting of: C$_{10}$ to C$_{24}$ fatty acids, metal salts of C$_{10}$ to C$_{24}$ fatty acids, amine salts of C$_{10}$ to C$_{24}$ fatty acids, and esters of C$_{10}$ to C$_{24}$ fatty acids with C$_1$ to C$_{18}$ monohydric alcohols.

6. A magnetic recording medium as defined in claim 1, wherein said binder is selected from the group consisting of: polyesters, polycarbonates, polyether polyurethanes, vinyl chloride copolymers, cellulose derivatives, phenoxy resins, acrylic acid ester copolymers, vinylidene chloride copolymers and styrene-butadiene copolymers.

7. A magnetic recording medium as defined in claim 1, wherein said binder is a mixture of a polyether polyurethane resin and a vinyl chloride copolymer resin.

8. A magnetic recording medium as defined in claim 1, further comprising an undercoating layer disposed between the substrate and said at least one magnetic layer.

9. A magnetic recording medium as defined in claim 1, further comprising a back coating layer disposed on a surface of said non-magnetic substrate opposite said at least one magnetic layer.

* * * * *